Patented Nov. 21, 1939

2,181,054

UNITED STATES PATENT OFFICE 2,181,054

MODIFIED ALKYD RESIN

Horace Arthur Hampton, Arthur Hill, and Edwin Brew Robinson, Manchester, England, assignors to Imperial Chemical Industries Limited, a corporation of Great Britain No Drawing. Application August 6, 1937, Serial No. 157,812. In Great Britain August 21, 1936

2 Claims. (Cl. 260—22)

This invention relates to the manufacture of improved synthetic resinous materials.

It has already been proposed to manufacture artificial resins by heating maleic acid or its anhydride with resinous condensation products of phthalic acid with polyhydric alcohols and colophony in the condensation of which mono-carboxylic acids, or oils containing the same or their esters, such as linoleic and ricinoleic acids have been condensed with the phthalic acid or polyhydric alcohols.

It has also been proposed to produce resinous materials by reacting simultaneously a polyhydric alcohol, phthalic acid, the acid or acids obtainable by hydrolysis of a fatty triglyceride and maleic acid in an amount not exceeding 15% by weight of the phthalic acid. It has further been indicated that such reactions may be conducted in the presence of a natural resin. None of the synthetic resins made by the above processes has had in combination pale colour, hardness, toughness, and good water resistance.

This invention has as an object to provide a method of manufacturing synthetic resins which will yield resins having a valuable combination of properties namely, pale colours, great hardness and toughness and excellent water resistance. A further object is to provide new synthetic resins with the above mentioned combination of properties. Further objects will appear hereinafter.

These objects are accomplished by the following invention. We have found that we can obtain resins with the above mentioned combination of properties if we employ clearly defined ratios of colophony and maleic acid to fatty acid constituents.

According to the invention we manufacture improved synthetic resinous materials by reacting together at 170–240° C. phthalic acid or its anhydride, drying or semi-drying oil fatty acids which may be in part replaced by the glycerides of the said fatty acids, 20% to 40% of colophony and 2.5% to 7% of maleic acid or its anhydride, both calculated on the weight of fatty reagents used and a polyhydric alcohol, e. g. glycerol, preferably in an amount theoretically required to esterify the total acidic reagents.

An excess of polyhydric alcohol up to about 10% of the preferred amount may be used without appreciable modification of the film-forming properties of the products. Substantially larger excesses are generally to be avoided as having a detrimental effect on the hardness and water-resistance of the products.

Products obtained by using substantially greater amounts of colophony and maleic acid than those defined yield excessively brittle films, whilst those obtained by use of smaller amounts have not the characteristic and valuable properties hereinbefore referred to.

In carrying the invention into effect the reaction temperature to be used within the defined range and also the duration of heating will depend on the ratio of the reagents used and the properties desired in the final resin. The higher the proportion of fatty reagents, the higher the maximum reaction temperature which may be used without causing the reaction mixture to form undesirable gels. The duration of heating will be governed by the viscosity and acid value characteristics desired in the final resin. In general, with the higher proportions of maleic acid a shorter time of heating is required than where smaller amounts of maleic acid are used.

Also according to the invention we utilize the improved synthetic resinous materials in the manufacture of coating compositions by dissolving the said resinous materials in a suitable lacquer or varnish solvent and incorporating, if desired, additional film-forming materials, driers, plasticisers, softeners and/or pigments.

The invention is illustrated but not limited by the following examples in which the parts are by weight.

Example 1

222 parts of phthalic anhydride, 115 parts of glycerol, 125 parts of linseed oil fatty acids, 8 parts of maleic acid, 55 parts of colophony (crystal rosin—acid value 160–170) and 82.5 parts of tung oil are heated in an atmosphere of carbon dioxide up to a temperature of 185°–190° C. The temperature is maintained at 185°–195° C. for 4 to 5 hours by which time the acid value of the reaction mixture has fallen to about 40–45. The reaction mixture is then cooled to atmospheric temperature. The synthetic resinous material so-obtained is a pale-coloured, brittle mass which dissolves in solvents such as, for example, xylene. A xylene solution when applied as a varnish dries rapidly to a pale-coloured, hard, water-resistant film, when baked at 100°–130° C. even without the addition of a drier.

Example 2

230 parts of phthalic anhydride, 116 parts of glycerol, 96 parts of soya bean oil fatty acids, 96 parts of a soya bean stand oil of viscosity 2–3 poises at 20° C., 48 parts of French WW rosin and 12 parts of maleic acid are heated together at 200°–205° C. in an atmosphere of nitrogen or carbon dioxide until the acid value of the reaction mixture falls to 55–60. When cold the reaction mixture is in the form of a pale-coloured, brittle mass. The synthetic resinous material so-obtained, when dissolved in a solvent, for example, xylene, and applied as a varnish, yields pale, hard, water-resistant films which do not become yellow in the absence of direct sunlight or when baked.

Example 3

742 parts of phthalic anhydride, 384 parts of glycerol, 128 parts of crystal rosin (acid value 160-170), 19 parts of maleic acid and 511 parts of dehydrated castor oil fatty acids (consisting chiefly of 9:11-octadecadiene-1-acid) are heated together at 195-200° C. in an atmosphere of carbon dioxide until the acid value falls to 55-60. The resulting synthetic resinous material, when used as a varnish ingredient, yields hard, water-resistant, "gas-proof" films which do not readily become yellow in the absence of sunlight or when subjected to baking.

Example 4

312 parts of phthalic anhydride, 19.5 parts of maleic acid, 138 parts of crystal rosin (acid value 160-170), 510 parts of dehydrated castor oil fatty acids and 210 parts of glycerol are heated together at 240° C. in an atmosphere of carbon dioxide until the acid value of the reaction mixture falls to about 20. The resinous material so obtained when used as an ingredient of varnishes or enamels yields hard, water-resistant films having a good gloss and good resistance to after-yellowing in subdued light.

Example 5

124 parts of soya bean stand oil (viscosity 156 centipoises at 20° C.), 82.5 parts of soya bean oil fatty acids, 69 parts of colophony (crystal rosin, acid value 160-170), 10.3 parts of maleic acid, 132 parts of phthalic anhydride, and 83 parts of glycerol are heated together at 225°-230° C. in an atmosphere of carbon dioxide until the acid value of the reaction mixture falls to about 13. The resin thus obtained is dissolved while still hot in high flash white spirits. There is thus obtained a clear yellow solution which when used as a varnish with the addition of cobalt linoleate as drier, gives pale, hard, water-resistant films.

Example 6

137.5 parts of soya bean stand oil (viscosity: 156 centipoises at 20° C.), 91.5 parts of soya bean oil fatty acids, 46 parts of colophony (crystal rosin, acid value 160-170), 6.9 parts of maleic acid, 136.5 parts of phthalic anhydride and 81.6 parts of glycerol are heated together at 225°-230° C. in an atmosphere of carbon dioxide for about 4 hours. The temperature is then raised to 240° C. and held there until the acid value of the reaction mixture has fallen to about 12. The resulting resin is dissolved in high flash white spirit. There is thus obtained a clear varnish which in the presence of cobalt linoleate dries to a pale water-resistant film slightly softer than that given by the resin made as described in Example 5.

As drying oil acids we may use, for example, linseed oil acids, China-wood oil acids or those acids having drying properties which may be obtained by dehydrating castor oil acids (see, for example, British Specification 306,452). As semi-drying oil fatty acids we may use, for example, soya bean oil acids or sunflower oil acids. As hereinbefore indicated, part of the drying or semi-drying oil acids may be replaced by their glycerides, for example, the drying or semi-drying oils themselves or by oils having drying properties which are obtained by dehydrating castor oil (see, for example, Friedländer Fortschritte der Teerfabrikation, vol. 19, 3118-3119, Berlin, 1934). If desired, heat polymerised drying or semi-drying oils may be used, as, for example, a linseed stand oil. The proportion of fatty acid which may be replaced by fatty glycerides will depend on the proportion of total fatty reagents to be used in the reaction mixture. For example, where the total fatty reagents are to be about 25%-30% of the reaction mixture then about 40% of the total fatty reagents may be in the form of glycerides and about 60% in the form of fatty acids whereas if the total fatty reagents are to be about 50%-55% of the reaction mixture then the ratio of fatty acid to fatty glyceride may be about 40:60.

The resinous products made according to the present invention, in which clearly defined proportions of colophony, maleic acid and glycerol are used, are superior to the products of the prior art and possess a particularly desirable combination of properties. Air-dried and stoved films made from these resins are hard, tough and water-resistant, pale in colour and resistant to after-yellowing in diffused light. Moreover, resinous products made according to the present invention from fatty oils (or the corresponding fatty acids, such, for example, as dehydrated castor oil fatty acids), which normally yields resins subject to gas-checking, exhibit this defect in lesser degree than do the products of the prior art.

As mentioned above resins obtained by using substantially greater amounts of colophony and maleic acid than those herein defined, yield excessively brittle films, whilst those obtained by use of smaller amounts yield films which are inferior in respect of hardness and toughness.

If the proportion of polyhydric alcohol used in making the resins is increased to an amount substantially greater than that indicated herein (namely about 10% in excess of that required to esterify all the acidic materials present) the colour, hardness, toughness and water-resistance of films made therefrom are adversely affected.

As many apparently widely different embodiments of this invention may be made without departing from the spirit and scope thereof it is to be understood that we do not limit ourselves to the specific embodiments thereof, except as defined in the appended claims.

We claim:

1. Process for the manufacture of improved synthetic resinous materials which comprises reacting at 170°-240° C. phthalic anhydride, a fatty ingredient selected from the class consisting of drying oil acids, semi-drying oil acids, and the glycerides of such acids, 20% to 40% of colophony and 2.5% to 7% of maleic acid, said amounts of colophony and maleic acid being based on the weight of said fatty ingredient, and a polyhydric alcohol in amount not substantially exceeding a 10% excess over that required to esterify the total acidic reagents employed.

2. The resinous reaction product obtained by reacting at 170°-240° C. phthalic anhydride, a fatty ingredient selected from the class consisting of drying oil acids, semi-drying oil acids, and the glycerides of such acids, 20% to 40% of colophony and 2.5% to 7% of maleic acid, said amounts of colophony and maleic acid being based on the weight of said fatty ingredient, and a polyhydric alcohol in amount not substantially exceeding a 10% excess over that required to esterify the total acidic reagents employed.

HORACE ARTHUR HAMPTON.
ARTHUR HILL.
EDWIN BREW ROBINSON.